No. 630,759. Patented Aug. 8, 1899.
D. R. VIVION.
PLANTER.
(Application filed June 2, 1899.)
(No Model.)
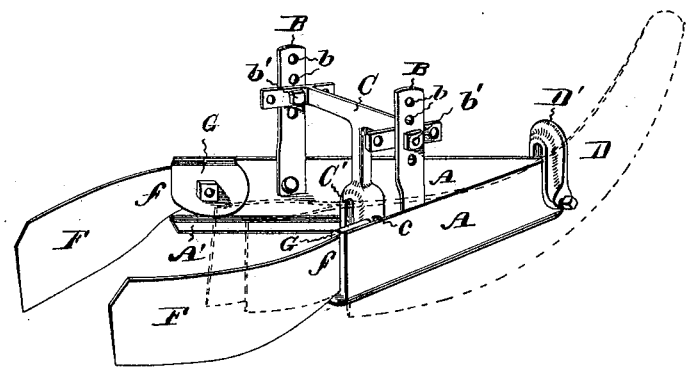
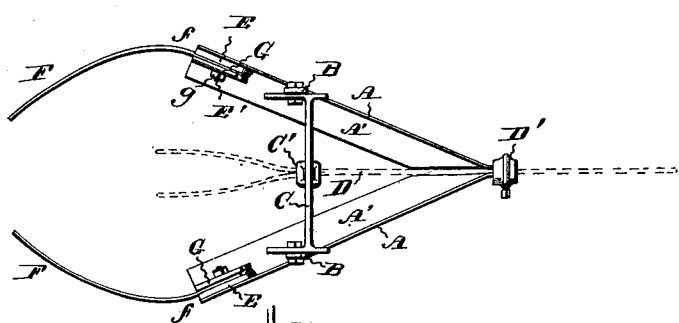
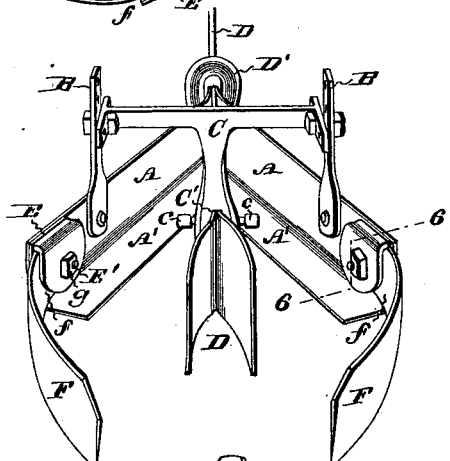
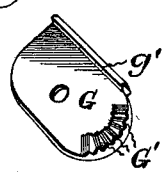
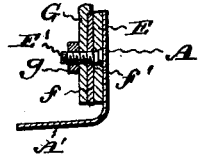
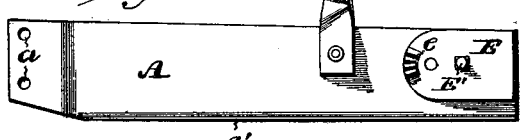
Witnesses
Edwin B. H. Tower, Jr.
Herbert D. Lawson
Inventor
David R. Vivion
By Edson Bros.
Attorneys

UNITED STATES PATENT OFFICE.

DAVID R. VIVION, OF COLUMBIA, MISSOURI.

PLANTER.

SPECIFICATION forming part of Letters Patent No. 630,759, dated August 8, 1899.

Application filed June 2, 1899. Serial No. 719,119. (No model.)

*To all whom it may concern:*

Be it known that I, DAVID R. VIVION, a citizen of the United States, residing at Columbia, in the county of Boone and State of Missouri, have invented certain new and useful Improvements in Planters; and I do hereby declare the following to be a full, clear, and exact description of the invention, such as will enable others skilled in the art to which it appertains to make and use the same.

This invention relates to improvements in planters, having reference particularly to that part of the machine which prepares the ground for the reception of seed and covers the seed when dropped, and is more particularly designed as an improvement on the gage and coverer for corn-planters disclosed in Letters Patent No. 589,321, granted to me on August 31, 1897.

The objects that I have in view in the present case are to provide an improved form of gage or drag adjustable longitudinally or vertically and having adjustable hoes secured thereto, whereby seed may be planted at any desired depth, to provide means simple in construction for securing the gage and hoe to the runner of the planter, and to simplify the construction of the device, as well as render it strong and durable, efficient in service, easily applicable to any style of corn or cotton planter, cutter, or opener, and cheap of manufacture.

To these ends the invention consists in the combination and novel construction of parts hereinafter more fully described and claimed, and illustrated in the accompanying drawings, showing the preferred form of my invention, and in which—

Figure 1 is a perspective view of the portion of a corn-planter embodying my invention and showing in dotted lines the runner in position. Fig. 2 is a top plan view thereof. Fig. 3 is a rear perspective view of the device. Fig. 4 is an inner elevation of the gage or drag with the hoe detached. Fig. 5 is a detail perspective view of the washer for retaining the hoe in proper position, and Fig. 6 is a section on line 6 6, Fig. 3.

Referring to said figures by letters of reference, A A are the gage-plates or drags, each formed of a single piece of metal bent inward along its lower edge, as at A', preferably provided with perforations $a$ at its forward end and having an upwardly-extending arm B secured thereto at a point intermediate its ends. Said arms are likewise provided with perforations $b$, whereby they may be bolted by means of bolts $b'$ to a substantially T-shaped gage-plate holder C, which is forked at its lower end, as at C', to receive the runner D, as shown, which runner is preferably secured therein by means of set-screws $c$. The forward ends of the gage-plates may be clamped securely to either side of the runner by means of the clevis or clamp D', as shown.

Preferably riveted to the inner surface of each of the gage-plates, at the rear end thereof, is a washer E, having a bolt E' projecting thereform and provided with teeth or serrations $e$ near its inner end. This washer is adapted to form one side of a clamp for securing the curved hoe F to the gage-plate. The inner reduced end $f$ of said hoe is placed upon washer E, the bolt E' passing through a perforation $f'$ therein. A washer G is then placed upon the hoe and a nut $g$ screwed upon the bolt E', which projects therethrough. This washer is likewise provided with teeth or serrations G', which are adapted to engage with the similar teeth upon the washer E, and its upper edge is shouldered, as at $g'$, said shoulder adapted to overlap the straight edge of the end $f$ of the hoe F.

In operation the gage-plates are adjusted longitudinally upon the runner to the desired position by loosening the clamps C' and D' and then resetting the same. The desired vertical adjustment is then obtained by bolting the arms B to the gage-plate holder through either of the perforations $b$ therein. It will be understood that in this manner the depth of the planted seed may be readily regulated, as the gage-plates carry the runner uniformly at any desired depth. By loosening the nut $g$ the washer G will become free of the teeth upon washer E, and the hoe F can then be placed at any desired angle and after being properly adjusted can be fixed in position by placing the shoulder $g'$ over the edge thereof and tightly screwing the nut $g$ upon the bolt E'.

It is obvious that the gage-plates, which are preferably arranged in A shape, will push away all clods, stones, &c., and that the hoes F can gather up nothing but the fine or pulverized dirt passing beneath said plates A.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. The combination, with a gage-plate, of teeth or serrations thereon, a washer to engage said serrations, and a hoe adapted to be clamped between the plate and washer, substantially as described.

2. The combination with a gage-plate, having a bolt and serrations thereon, of a washer adapted to engage with said serrations and having a shouldered edge, and an adjustable hoe adapted to be held intermediate the plate and washer and abut against the shoulder, substantially as described.

3. The combination, with a gage-plate, of a bolt and plate rigidly secured thereto, teeth or serrations on said plate, a washer provided with similar serrations adapted to engage with the serrations of the plate, a longitudinally-extending shoulder on the washer, and an adjustable hoe adapted to be held intermediate the plate and washer and having a straight edge abutting against said shoulder, substantially as described.

4. The combination, with the runner, of the gage-plates secured thereto and longitudinally and vertically adjustable thereon, a holder secured to the runner, arms on said gage-plates secured to the holder and longitudinally and vertically adjustable thereon, and hoes adjustably secured to the gage-plates, substantially as described.

In testimony whereof I affix my signature in presence of two witnesses.

DAVID R. VIVION.

Witnesses:
W. S. PRATT,
W. A. VIVION.